United States Patent [19]

Miyamoto

[11] Patent Number: 4,938,463
[45] Date of Patent: Jul. 3, 1990

[54] FLUID-FILLED VIBRATION DAMPER

[75] Inventor: Yasuo Miyamoto, Tochigi, Japan

[73] Assignee: Honda Giken Kogyo Kabushiki Kaisha, Tokyo, Japan

[21] Appl. No.: 361,207

[22] Filed: Jun. 5, 1989

[30] Foreign Application Priority Data

Jun. 6, 1988 [JP] Japan .............................. 63-74856[U]

[51] Int. Cl.$^5$ .............................................. F16F 5/00
[52] U.S. Cl. .................................. 267/140.1; 267/219
[58] Field of Search .................. 248/562; 267/140.1 R, 267/140.1 A, 140.1 C, 219

[56] References Cited

U.S. PATENT DOCUMENTS

| | | | |
|---|---|---|---|
| 4,159,091 | 6/1979 | Le Salver et al. | 267/140.1 A X |
| 4,595,183 | 6/1986 | Dan et al. | 267/140.1 A |
| 4,651,980 | 3/1987 | Morita | 267/140.1 |
| 4,653,734 | 3/1987 | Jördens | 267/140.1 A X |

FOREIGN PATENT DOCUMENTS

| | | |
|---|---|---|
| 60-53213 | 11/1985 | Japan . |
| 62-53735 | 11/1987 | Japan . |
| 63-38730 | 2/1988 | Japan . |
| 63-280943 | 11/1988 | Japan . |

*Primary Examiner*—Duane A. Reger
*Attorney, Agent, or Firm*—Armstrong, Nikaido, Marmelstein, Kubovcik & Murray

[57] ABSTRACT

A fluid-filled vibration damper includes a partition which is vibratable to absorb vibrations with small amplitudes. When vibrations with amplitudes greater than a certain amplitude level are continuously applied over a certain period of time, the vibrations of the partition are substantially stopped. The fluid-filled vibration damper comprises an attachment adapted to be attached to a vibration source, a base adapted to be attached to a structural member, an elastomeric member interconnecting the attachment and the base, a diaphragm disposed in either the attachment or the base, the elastomeric member and the diaphragm defining therebetween a fluid chamber filled with a fluid, a partition disposed in the fluid chamber and dividing the fluid chamber into first and second fluid chambers, a passage providing fluid communication between the first and second fluid chambers, and a stop assembly disposed between the partition and the first fluid chamber and between the partition and the second fluid chamber and spaced from the partition with a clearance therebetween, the stop assembly limiting vibration of the partition while allowing the partition to move transversely within a predetermined range, the partition having therein an auxiliary fluid chamber having a variable volume and communicating with at least one of the first and second fluid chambers, the auxiliary fluid chamber being expandable to reduce the clearance between the partition and the stop assembly when the fluid flows from said at least one fluid chamber into the auxiliary fluid chamber.

10 Claims, 4 Drawing Sheets

FLUID-FILLED VIBRATION DAMPER

BACKGROUND OF THE INVENTION

1. Field of the Invention

The present invention relates to a vibration damper with a fluid filled therein.

2. Description of the Relevant Art

One known fluid-filled vibration damper has a partition plate disposed in a fluid-filled chamber and slightly movable in transverse directions thereof for absorbing vibrations of small amplitudes. Such a fluid-filled vibration damper is shown in FIG. 8 of the accompanying drawings. The fluid-filled vibration damper has a fluid chamber 100 defined between an elastomeric member 140 and a diaphragm 160 and filled with a fluid, The fluid chamber 100 is divided by a partition 130 into a first fluid chamber 101 and a second fluid chamber 102. The partition 130 is movable a small distance in transverse directions thereof (vertically in FIG. 8) between upper and lower stops 103, 104 which limit the transverse movement of the partition 130. The vibration damper has an attachment 110 attached to a vibration source such as an engine, and a base 120 attached to a structural member such as a vehicle body Vibrations of small amplitudes which are transmitted from the vibration source are absorbed by vertical oscillation of the partition 130 between the upper and lower stops 103, 104. When the vibration source vibrates with large amplitudes, the fluid flows through an orifice 150 through which the first and second fluid chambers 101, 102 communicate with each other, for producing damping forces.

When a motor vehicle with the above fluid-filled vibration damper used as an engine mount runs on a road having a continuous spread of relatively small surface irregularities, the attachment 110 is repeatedly vibrated with amplitudes exceeding a certain level in response to vertical movement of the motor vehicle. Such repeated vibration of the attachment 110 beyond the certain amplitude level causes the partition 130 to vibrate vertically. Since the rate of flow of the fluid through the orifice 150 is lowered by the vertical movement of the partition 130, the vibration damper cannot produce sufficient damping forces. Therefore, the vibrations generated while the motor vehicle is running on a bumpy road.

SUMMARY OF THE INVENTION

It is an object of the present invention to provide a fluid-filled vibration damper for absorbing vibrations of small amplitudes with the motion of a partition and for increasing damping forces by substantially stopping vibrations of the partition when vibrations with amplitudes in excess of a certain amplitude level are applied over a certain period of time.

According to the present invention, there is provided a fluid-filled vibration damper comprising an attachment adapted to be attached to a vibration source, a base adapted to be attached to a structural member, an elastomeric member interconnecting the attachment and the base, a diaphragm disposed in either the attachment or the base, the elastomeric member and the diaphragm defining therebetween a fluid chamber filled with a fluid, a partition disposed in the fluid chamber and dividing the fluid chamber into first and second fluid chambers, a passage providing fluid communication between the first and second fluid chambers, and a stop assembly disposed between the partition and the first fluid chamber and between the partition and the second fluid chamber and spaced from the partition with a clearance therebetween, the stop assembly limiting vibration of the partition while allowing the partition to move transversely within a predetermined range, the partition having therein an auxiliary fluid chamber having a variable volume and communicating with at least one of the first and second fluid chambers, the auxiliary fluid chamber being expandable to reduce the clearance between the partition and the stop assembly when the fluid flows from said at least one fluid chamber into the auxiliary fluid chamber.

With the above arrangement, vibrations with small amplitudes are absorbed by the motion of the partition. When vibrations with amplitudes greater than a certain amplitude level are continuously applied over a certain period of time, the fluid flows from one of the first and second fluid chambers into the auxiliary fluid chamber in the partition. The auxiliary fluid chamber is thus expanded to reduce the clearance between the partition and the stop assembly. Since the vibrations of the partition are therefore substantially stopped, the fluid-filled vibration damper produces increased damping forces.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
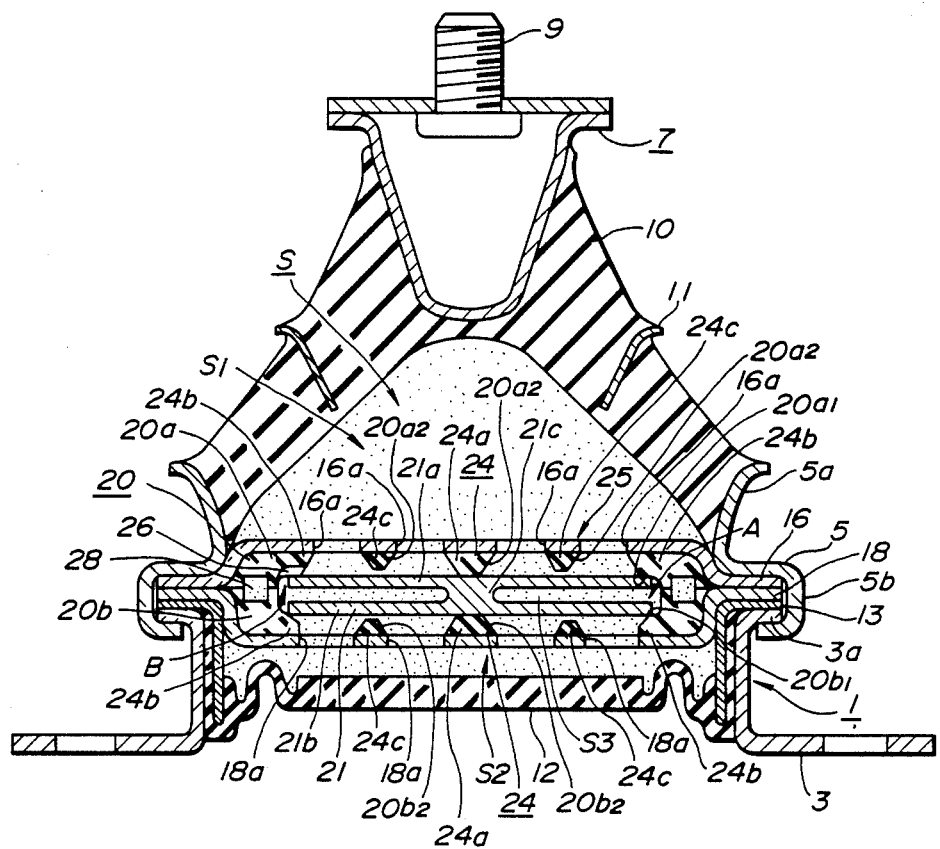
FIG. 1 is a vertical cross-sectional view of a fluid-filled vibration damper according to an embodiment of the present invention.

FIG. 1 shows a fluid-filled vibration damper according to an embodiment of the present invention. The fluid-filled vibration damper includes a base 1 comprising a support 3 adapted to be attached to a structural member such as a vehicle body, and a cylindrical holder 5 joined to the support 3. The holder 5 has a conical taper portion 5a and an annular portion 5b extending downwardly from the conical taper portion 5a. The fluid-filled vibration damper has an attachment 7 which will be connected to a vibration source such as an engine by means of a bolt 9.

The fluid-filled vibration damper also includes an elastomeric member 10 having a recess defined in its upper end by an inner peripheral surface which is integrally joined to the outer peripheral surface of the attachment 7 by vulcanization or the like. The elastomeric member 10 has a lower outer peripheral surface integrally joined to the inner peripheral surface of the conical taper portion 5a of the holder 5 by vulcanization or the like. An annular ring 11 is embedded in an intermediate portion of the elastomeric member 10, the annular ring 11 being of a substantially cylindrical shape which is concentric with and larger in diameter than the attachment 7.

A diaphragm 12 is disposed in sealingly closing the bottom opening of the support 3. A flange 13 is fixed to the outer periphery of the diaphragm 12. A stop assembly 25 disposed above the diaphragm 12 has upper and lower support plates 16, 18 of metal. The flange 13 and outer peripheral edges of the support plates 16, 18 are clamped between an upper marginal edge 3a of the support 3 and an upper marginal edge of the annular portion 5b of the holder 5.

A fluid chamber S filled with a fluid is defined between the elastomeric member 10 and the diaphragm 12.

The stop assembly 25 includes a rubber stop plate 20 comprising a pair of upper and lower stop plate members 20a, 20b joined to each other and having plural holes 20a2, 20b2, respectively, the stop plate 20 being sandwiched between the support plates 16, 18. The holes 20a2, 20b2 in the stop plate members 20a, 20b form tapered projections 24a, 24b, 24c (generally indicated by the reference numeral 24) extending into the space between the stop plate members 20a, 20b. The portions of the stop plate members 20a, 20b which are joined to each other have annular steps 20a1, 20b1 defined by the projections 24b.

The support plates 16, 18 are substantially discshaped as viewed in plan. The support plates 16, 18 have plural holes 16a, 18a, respectively, defined in central areas thereof in registration with the respective holes 20a2, 20b2 in the stop plate members 20a, 20b.

A chamber A is defined between the stop plate members 20a, 20b of the stop assembly 20, and a partition 21 is disposed in the chamber A. The partition 21 divides the fluid chamber S into a first fluid chamber S1 and a second fluid chamber S2 below the first fluid chamber S1. A small gap or clearance B is defined between the side walls of the annular steps 20a1, 20b1 and the outer peripheral edge of the partition 21.

The central projections 24a of the stop plate members 20a, 20b and the outer projections 24b thereof which define the annular steps 20a1, 20b are held against the partition 21, whereas the other intermediate projections 24c are spaced from the partition 21 with a certain gap or clearance left therebetween The annular step 20a1 of the stop plate member 20a has a slit 26 defined therein for passage of the fluid therethrough. A spiral fluid passage or orifice 28 is defined between the stop plate members 20a, 20b and has openings through which the first and second fluid chambers S1, S2 are held in fluid communication with each other.

The partition 21 comprises a pair of partition plate members 21a, 21b and a joint 21c by which the partition plate members 21a, 21b are coupled to each other. The partition plate members 21a, 21b jointly define an auxiliary fluid chamber S3 therebetween. In the illustrated embodiment, the partition plate members 21a, 21b and the joint 21c are integrally formed of rubber.

Figure 2:
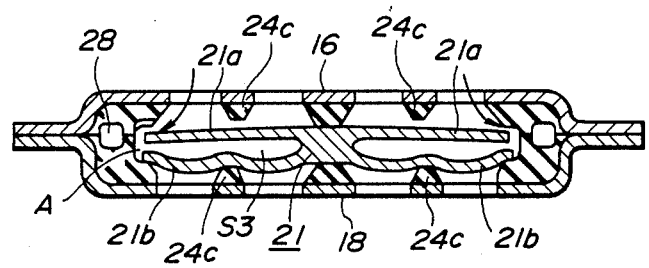
FIGS. 2 and 3 are vertical cross-sectional views showing the manner in which the fluid-filled vibration damper shown in FIG. 1 operates.

When the attachment 7 is vibrated with small amplitudes in response to vibration of the vibration source with small amplitudes, the partition 21 is caused to vibrate between the intermediate projections 24c of the stop plate 20 to absorb the vibration applied to the vibration damper If the vibration source vibrates with amplitudes greater than a certain amplitude level, then the fluid in the first fluid chamber S1 flows into the chamber A while pushing the outer edge of the plate member 21a as indicated by the arrows in FIG. 2, and then flows into the auxiliary fluid chamber S3 in the partition 21. The auxiliary fluid chamber S3 is now expanded to reduce the gaps or clearances between the plate members 21a, 21b and the intermediate projections 24c. The vibration of the partition 21 is therefore suppressed, and the pressure of the fluid in the first fluid chamber S1 is increased. Accordingly, the rate of flow of the fluid through the spiral fluid passage 28 extending between the first and second fluid chambers S1, S2 is increased to produce greater damping forces. Continued vibration applied to the vibration damper further expands the auxiliary fluid chamber S3 until the plate members 21a, 21b are forced into abutment against the intermediate projections 24c, whereupon the vibration of the partition 21 is substantially stopped resulting in a further increase in the damping forces.

Figure 3:
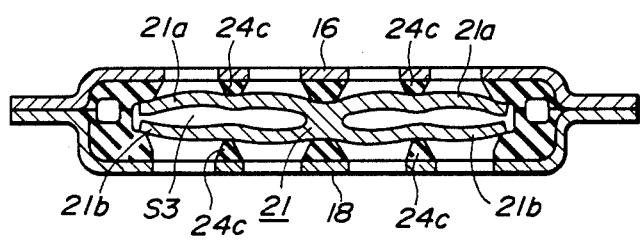

When an automobile with the fluid-filled vibration damper used for supporting the engine runs continuously on a long bumpy road over a certain period of time, the fluid flows from the fluid chamber S1 into the auxiliary fluid chamber S3 due to vibrations caused with amplitudes higher than a certain level by the surface irregularities of the road. The auxiliary fluid chamber S3 is now expanded as shown in FIG. 3 to increase the damping forces in subsequent running of the automobile, i.e., after the certain period of time.

When the vibrations with amplitudes higher than the certain level are no longer applied, the fluid in the auxiliary fluid chamber S3 returns through the slit 26 into the fluid chamber S1, and the partition 21 restores its original shape as shown in FIG. 1.

The fluid-filled vibration damper of the above embodiment also offers the following advantages. Since the gaps between the intermediate projections 24c of the stop plate 20 and the partition 21 are defined by the flat surfaces of the tips of the projections 24c and the flat upper and lower surfaces of the partition 21, the gaps can easily be defined with high dimensional accuracy.

Because the intermediate projections 24c have tapered sides, the fluid can quickly flow along the tapered sides from positions between the tips of the intermediate projections 24c and the partition 21 when the auxiliary fluid chamber S3 is expanded.

Figure 4:
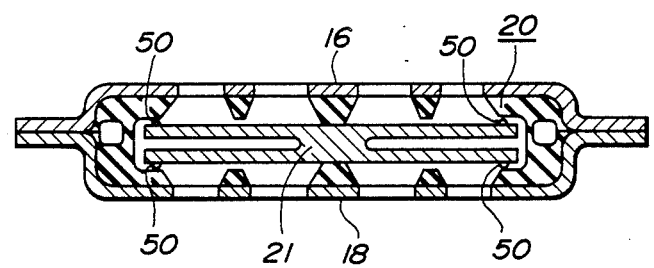
FIGS. 4 through 7 are vertical cross-sectional views of stop plates and partitions in fluid-filled vibration dampers according to other embodiments of the present invention.
Figure 5:
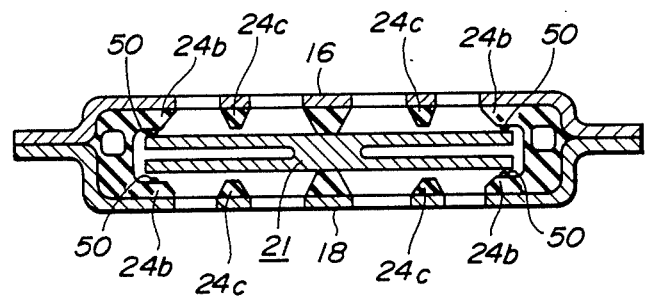

FIGS. 4 through 7 show stop plates and partitions therein according to other embodiments of the present invention. In the embodiment shown in FIG. 4, a stop plate 20 has no slit, and a partition 21 has a plurality of protrusions 50 on its upper and lower surfaces near the outer peripheral edge thereof. The protrusions 50 provide gaps between the partition 21 and the stop plate 20 for allowing the fluid to pass therethrough. The other structural details of the assembly shown in FIG. 4 are identical to those shown in FIG. 1. FIG. 5 shows another embodiment in which protrusions 50 are provided on the outer projections 24b of the stop plate 20.

Figure 6:
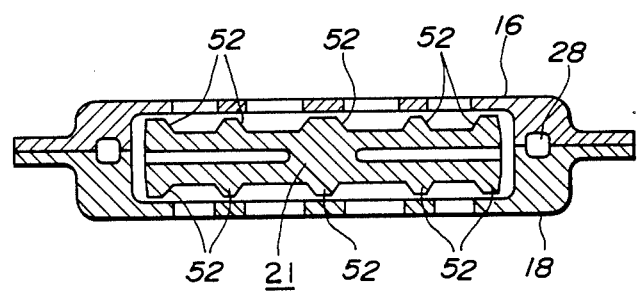
Figure 7:
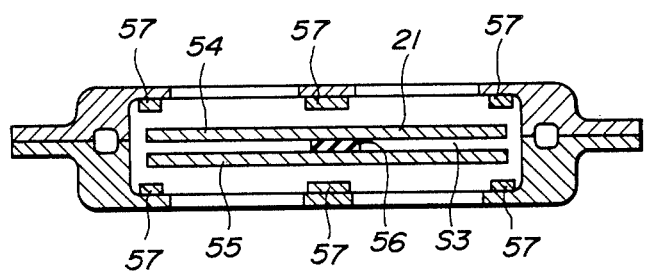
Figure 8:
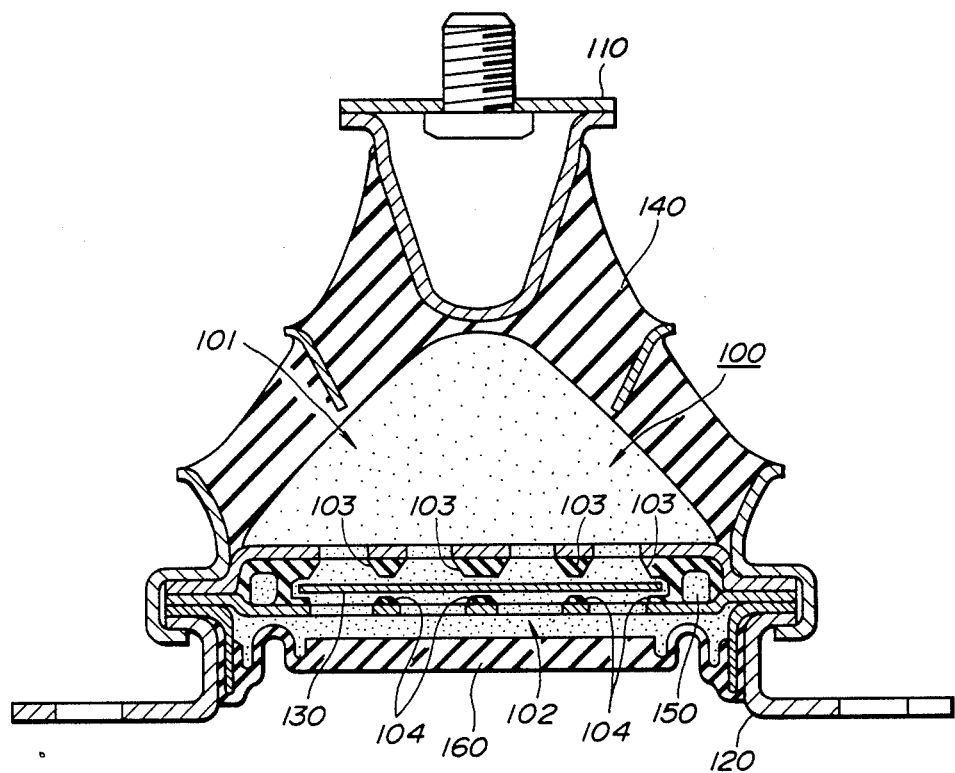
FIG. 8 is a vertical cross-sectional view of a conventional fluid-filled vibration damper.

According to the embodiment shown in FIG. 6, no stop plate is employed, a fluid passage 28 is defined between the support plates 16, 18, and tapered projections 52 are provided on the upper and lower surfaces of a partition 21 disposed between the support plates 16, 18. In the embodiment shown in FIG. 7, a partition 21 is constructed of a pair of plate members 54, 55 of metal and a joint 56 of rubber disposed between and interconnecting the plate members 54, 55. Stoppers 57 are fixed to inner surfaces of the support plates 16, 18. With the assembly shown in FIG. 7, when the attachment 7 is continuously vibrated with amplitudes higher than a certain level, the fluid flows into an auxiliary fluid chamber S3 defined between the plate members 54, 55 to move the plate members 54, 55 away from each other.

With the fluid-filled vibration damper according to the present invention, as described above, when vibrations with amplitudes larger than a certain amplitude level are continuously applied to the vibration damper over a certain period of time, the fluid flows from the fluid chamber into the auxiliary fluid chamber to expand the auxiliary fluid chamber toward the stop plate to reduce the gaps or clearances between the partition and the stop plate. Therefore, the damping forces produced by the fluid-filled vibration damper are automatically increased.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. A fluid-filled vibration damper comprising;
an attachment for attachment to a vibration source;
a base for attachment to a structural member;
an elastomeric member interconnecting said attachment and said base;
a diaphragm disposed on one of said attachment and said base;
said elastomeric member and said diaphragm defining therebetween a fluid chamber filled with a fluid;
a partition disposed in said fluid chamber and dividing the fluid chamber into first and second fluid chambers;
a passage providing fluid communication between said first and second fluid chambers;
a stop assembly disposed between said partition and said first fluid chamber and between said partition and said second fluid chamber and spaced from said partition with a clearance therebetween, said stop assembly limiting vibration of said partition while allowing the partition to move transversely within a predetermined range; and
said partition having therein an auxiliary fluid chamber having a variable volume and communicating with at least one of said first and second fluid chambers, said auxiliary fluid chamber being expandable to reduce said clearance between said partition and said stop assembly when the fluid flows from said at least one fluid chamber into said auxiliary fluid chamber.

2. A fluid-filled vibration damper according to claim 1, wherein said partition comprises a pair of partition plate members and a joint interconnecting said partition plate members, said auxiliary fluid chambers being defined between said partition plate members 3. A fluid-filled vibration damper according to claim 2, wherein said partition is integrally formed of rubber.

4. A fluid-filled vibration damper according to claim 1, wherein said stop assembly comprises a stop plate having a plurality of holes and a plurality of projections, and a pair of support plates each having a plurality of holes in registration with the holes in said stop plate, said stop plate being sandwiched between said support plates.

5. A fluid-filled vibration damper according to claim 4, wherein said projections of the stop plate include central, intermediate, and outer projections, said central and outer projections being held against said partition, said intermediate projections being spaced from said partition by said clearance.

6. A fluid-filled vibration damper according to claim 5, wherein one of said outer projections has a slit for passage of the fluid therethrough from said auxiliary fluid chamber into either said first fluid chamber or said second fluid chamber.

7. A fluid-filled vibration chamber according to claim 5, wherein said partition has a plurality of protrusions on upper and lower surfaces thereof near outer peripheral edges thereof, said protrusions defining gaps between said partition and said stop plates for passage of the fluid therethrough from said auxiliary fluid chamber into either said first fluid chamber or said second fluid chamber.

8. A fluid-filled vibration damper according to claim 5, wherein said stop plate has a plurality of protrusions on said outer projections thereof, said protrusions defining gaps between said partition and said stop plate for passage of the fluid therethrough from said auxiliary fluid chamber into either said first fluid chamber or said second fluid chamber.

9. A fluid-filled vibration damper according to claim 1, wherein said partition has a plurality of projections on upper and lower surfaces thereof, said stop assembly comprising a pair of support plates each having a plurality of holes and spaced from said projections of said partition by said clearance.

10. A fluid-filled vibration damper according to claim 1, wherein said base comprises a support and a holder joined to said support, said stop assembly having an outer peripheral edge clamped by said holder.

* * * * *